(12) United States Patent
Hong

(10) Patent No.: US 9,600,127 B2
(45) Date of Patent: Mar. 21, 2017

(54) DISPLAY DEVICE INTEGRATED WITH TOUCH SCREEN PANEL

(71) Applicant: Samsung Display Co., Ltd., Yongin, Gyeonggi-do (KR)

(72) Inventor: Sang-Min Hong, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 37 days.

(21) Appl. No.: 14/535,190

(22) Filed: Nov. 6, 2014

(65) Prior Publication Data

US 2015/0138146 A1 May 21, 2015

(30) Foreign Application Priority Data

Nov. 19, 2013 (KR) .................. 10-2013-0140817

(51) Int. Cl.
*G06F 3/044* (2006.01)
*G06F 3/047* (2006.01)
*G06F 3/041* (2006.01)
*G09G 3/32* (2016.01)

(52) U.S. Cl.
CPC ............ *G06F 3/044* (2013.01); *G06F 3/0412* (2013.01); *G06F 2203/04102* (2013.01)

(58) Field of Classification Search
CPC ..................................................... G06F 3/044
See application file for complete search history.

(56) References Cited

U.S. PATENT DOCUMENTS

| | | |
|---|---|---|
| 2007/0176563 A1 | 8/2007 | Kim et al. |
| 2009/0126403 A1 | 5/2009 | Abramov et al. |
| 2009/0218925 A1 | 9/2009 | Kwak |
| 2011/0134056 A1* | 6/2011 | Kim ..................... G06F 3/0412 345/173 |
| 2011/0134094 A1 | 6/2011 | Nathan et al. |
| 2011/0221720 A1 | 9/2011 | Kuo et al. |

(Continued)

FOREIGN PATENT DOCUMENTS

| | | |
|---|---|---|
| KR | 10-0671643 B1 | 1/2007 |
| KR | 10-0897157 B1 | 5/2009 |

(Continued)

*Primary Examiner* — Seokyun Moon
*Assistant Examiner* — Peijie Shen
(74) *Attorney, Agent, or Firm* — Knobbe, Martens, Olson & Bear, LLP

(57) ABSTRACT

A display device with an integrated touch screen panel is disclosed. In one aspect, the display device includes an upper substrate and a lower substrate each including a display region and a non-display region. A sealing member is formed between the non-display regions of the upper and lower substrates and the sealing member includes a first region and a second region, wherein the second region is located adjacent to the corners of the substrates. An electrode is formed over substantially the entire display region of the lower substrate. A power line is formed in the non-display region of the lower substrate and a first connection electrode is formed electrically connecting the power line to an end portion of the electrode. Each of the power line, the end portion of the electrode, and the first connection electrode at least partially overlaps the first region and does not overlap the second region.

14 Claims, 4 Drawing Sheets

(56) References Cited

U.S. PATENT DOCUMENTS

| | | | |
|---|---|---|---|
| 2011/0242021 A1* | 10/2011 | Jun | ......................... G06F 3/044 |
| | | | 345/173 |
| 2012/0043880 A1 | 2/2012 | Lee | |
| 2012/0104420 A1* | 5/2012 | Lee | ..................... H01L 27/3276 |
| | | | 257/88 |
| 2013/0077917 A1 | 3/2013 | Lassalas et al. | |
| 2013/0314625 A1* | 11/2013 | Tsai | ......................... G06F 3/044 |
| | | | 349/12 |
| 2014/0198267 A1 | 7/2014 | Jeong et al. | |

FOREIGN PATENT DOCUMENTS

| | | |
|---|---|---|
| KR | 10-2011-0062469 A | 6/2011 |
| KR | 10-2012-0017928 A | 2/2012 |
| KR | 10-2014-0093092 A | 7/2014 |

\* cited by examiner

DISPLAY DEVICE INTEGRATED WITH TOUCH SCREEN PANEL

CROSS-REFERENCE TO RELATED APPLICATIONS

This application claims priority to and the benefit of Korean Patent Application No. 10-2013-0140817, filed on Nov. 19, 2013, in the Korean Intellectual Property Office, the entire contents of which are incorporated herein by reference in their entirety.

BACKGROUND

Field

The described technology generally relates to a display device integrated with a touch screen panel.

Description of the Related Technology

Touch screen panels are input devices that enable instructions or images displayed on the screen of a display device to be selected as an input signal by a user's hand or an object.

Touch screen panels are provided on the front side of display devices and convert a contact position directly touched by a user's hand or an object into an electrical signal. Thus, the instruction displayed at the contact position is selected or recognized based on the input signal.

Touch screen panels can replace other input devices such as a keyboard, mouse, or the like, and thus, can be applied to a wide variety of display applications.

Touch screen panels can be implemented based on a number of different sensed measurements, such as resistance, photo sensitivity, capacitance, etc. Capacitive touch screen panels are configured such that, when a user's hand or an object comes into contact with the capacitive touch screen panel, a change in the capacitance between neighboring sensing patterns is measured and the measured capacitance is converted into an electrical signal based on the contact position.

SUMMARY OF CERTAIN INVENTIVE ASPECTS

One inventive aspect is a display device integrated with a touch screen panel in which a touch screen panel is directly formed on an upper substrate, sensing lines of the touch screen panel formed on the upper substrate overlap with a sealing material encapsulating the upper substrate and a lower substrate, and a power line formed on the lower substrate, an end portion of an electrode connected to a pixel part, and a connection part connecting the end portion of the electrode and the power line overlap with a region excluding a corner region of the sealing material.

Another aspect is a display device integrated with a touch screen panel including an upper substrate and a lower substrate divided into a display region and a non-display region formed in outer edge of the display region, respectively, a sealing material formed between non-display regions of the upper substrate and the lower substrate, a plurality of sensing patterns formed in the display region of the upper substrate, a plurality of sensing lines formed in the non-display region of the upper substrate and connected to the sensing patterns, respectively, a plurality of pixels formed in the display region of the lower substrate, and at least one power line formed in the non-display region of the lower substrate, an end portion of an electrode connected to the pixels, and a connection part electrically connecting the end portion of the electrode and the power line, wherein the at least one power line formed on the lower substrate, the end portion of the electrode, and the connection part overlap with a first region excluding a corner region of the sealing material.

The sealing material may include a first region formed to have a linear shape and a second region formed as a corner region and having a bent shape.

The electrode may completely overlap with the display region and an end portion thereof may extend to the non-display region to partially overlap with the first region of the sealing material.

A corner portion of the end portion of the electrode may have a concave shape in a direction toward the display region so as not to overlap with the corner region of the sealing material.

A connection part connected to the corner portion of the end portion of the electrode may be bent toward the display region so as not to overlap with the corner region of the sealing material.

The electrode may be a cathode electrode of an OLED provided in each pixel.

The power line may be a second power line applying a second voltage having a low potential level to the OLED provided in each pixel.

The sensing lines formed in the non-display region of the upper substrate may be arranged in a region overlapping with the sealing material.

The sensing patterns may include first sensing cells formed to be connected to each other by row in a first direction, first connection lines connecting the first sensing cells in the first direction, second sensing cells formed to be connected to each other by column in a second direction, and second connection lines connecting the second sensing cells in the second direction.

The sensing patterns may be formed on the same layer. The second sensing cells may be integrally formed with the second connection lines and the display device may further include insulating layers interposed in intersections of the first connection lines and the second connection lines.

The sensing patterns may be formed in an outer surface of the upper substrate, and the upper substrate may be an encapsulation substrate of an OLED display.

Another aspect is a touch screen display including an upper substrate and a lower substrate each including a display region and a non-display region surrounding the display region, wherein each of the substrates includes a plurality of corners, a sealing member formed between the non-display regions of the upper and lower substrates, wherein the sealing member includes a first region and a second region and wherein the second region is located adjacent to the corners of the substrates, a plurality of sensing patterns formed in the display region of the upper substrate, a plurality of sensing lines formed in the non-display region of the upper substrate and respectively electrically connected to the sensing patterns, a plurality of pixels formed in the display region of the lower substrate, an electrode formed over substantially the entire display region of the lower substrate and electrically connected to each of the pixels, at least one power line formed in the non-display region of the lower substrate, and a first connection electrode electrically connecting the power line to an end portion of the electrode, wherein each of the power line, the end portion of the electrode, and the first connection electrode at least partially overlaps the first region and does not overlap the second region.

The first region has a substantially linear shape and the second region has a substantially L or reverse L-shape. The end portion of the electrode extends to the non-display region. A corner portion of the end portion of the electrode has a concave shape formed towards the display region so as to not overlap the second region of the sealing member. Touch screen display further includes a second connection electrode electrically connecting the power line to the end portion of the electrode, wherein the second connection electrode has a concave shape formed towards the display region so as to not overlap the second region of the sealing member.

Each pixel includes an organic light-emitting diode (OLED) and the electrode is a cathode electrode of each OLED. The power line is configured to apply a low potential voltage to each of the OLEDs. The sensing lines are arranged in a region at least partially overlapping the sealing member. The sensing patterns include a plurality of first sensing cells electrically connected to each other to form a plurality of rows in a first direction, a plurality of first connection lines electrically connecting the first sensing cells in the first direction, a plurality of second sensing cells electrically connected to each other to form a plurality of columns in a second direction crossing the first direction, and a plurality of second connection lines electrically connecting the second sensing cells in the second direction.

The first and second sensing patterns are formed on the same layer. The second sensing cells are integrally formed with the second connection lines. The touch screen display further includes an insulating layer interposed between the first and second connection lines. The sensing patterns are formed on an outer surface of the upper substrate. The upper substrate comprises an encapsulation substrate substantially sealing the OLEDs.

Another aspect is a display device including a substrate comprising a display region and a non-display region surrounding the display region, wherein the substrate has a plurality of corners, a sealing member formed in the non-display region, wherein the sealing member comprises a first region and a second region and wherein the second region is located adjacent to the corners, a plurality of pixels formed in the display region, a plurality of sensing patterns formed over the pixels in the display region, and a plurality of sensing lines formed in the non-display region and respectively electrically connected to the sensing patterns, wherein the sensing lines at least partially overlap the first region and do not overlap the second region.

The display device further includes an electrode interposed between the pixels and the sensing patterns and a power line formed in the non-display area and electrically connected to the electrode, wherein the electrode and the power line each at least partially overlap the first region and do not overlap the second region. The display device further includes a power source and a connection power line formed in the non-display region and electrically connected to the power source and the power line, wherein the connection power line has a concave shape formed towards the display region so as to not overlap the second region of the sealing member.

The electrode has a plurality of corners respectively corresponding to the corners of the substrate and each of the corners of the electrode has a concave shape formed towards the display region so as to not overlap the second region of the sealing member. The display device further includes a first connection electrode formed in the non-display area and electrically connected to the power line and the electrode, wherein the first connection electrode at least partially overlaps the first region and does not overlap the second region. The display device further includes a second connection electrode electrically connecting the power line to the electrode, wherein the second connection electrode has a concave shape formed towards the display region so as to not overlap the second region of the sealing member.

DETAILED DESCRIPTION OF CERTAIN INVENTIVE EMBODIMENTS

Figure 1:
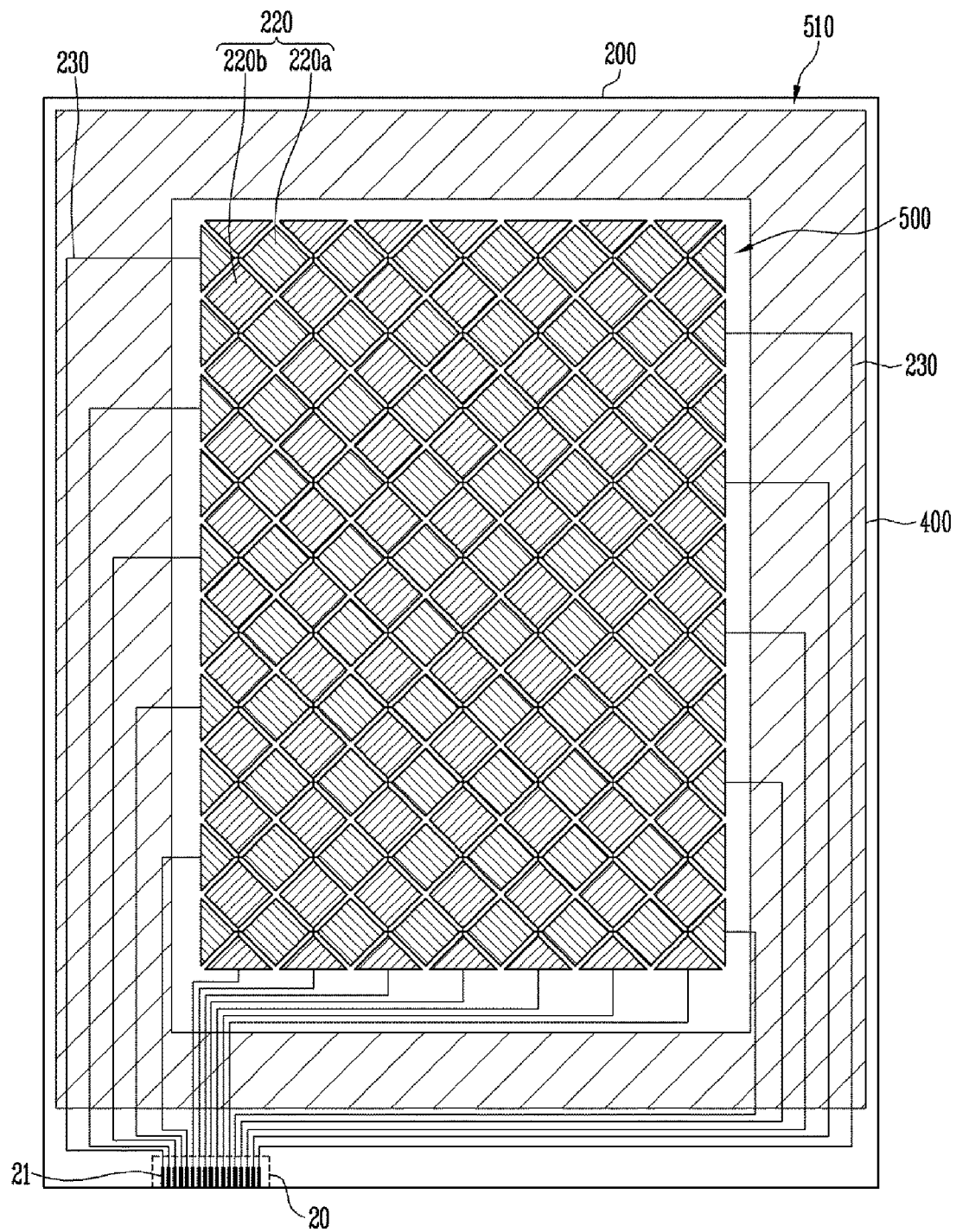
FIG. 1 is a view illustrating an upper substrate of a display device integrated with a touch screen panel according to an embodiment.

Hereinafter, embodiments of the described technology will be described in detail with reference to the accompanying drawings.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 2:
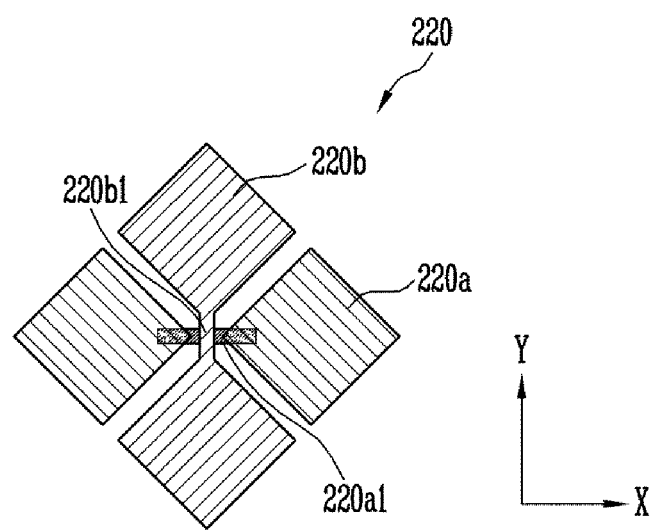
FIG. 2 is an enlarged view of a portion of the sensing pattern illustrated in FIG. 1.

FIG. 1 is a view illustrating an upper substrate of a display device integrated with a touch screen panel according to an embodiment. FIG. 2 is an enlarged view of a portion of the sensing pattern illustrated in FIG. 1.

The embodiment of FIG. 1 is directed to a display device integrated with a touch screen panel (or a touch screen panel-integrated display device) in which a touch screen panel is directly formed on one surface of an upper substrate 200 of the display device.

In the FIG. 1 embodiment, the one surface of the upper substrate 200 corresponds to an outer surface of the upper substrate. FIG. 1 is a plan view illustrating an outer surface of the upper substrate 200 of the display device according to an embodiment.

However, FIG. 1 is only an embodiment of the described technology and embodiments of the described technology are not limited thereto. Namely, the touch screen panel may be formed in an inner surface of the upper substrate 200, or first sensing cells 220*a* implementing sensing patterns 220 of the touch screen pattern may be formed on an inner surface of the upper substrate 200 and second sensing cells 220*b* alternately arranged so as to not overlap the first sensing cells 220*a* may be formed on an outer surface of the upper substrate 200.

Also, the display device may be an organic light-emitting diode (OLED) display or a liquid crystal display (LCD). As an embodiment of the described, technology, an OLED display will be described as an example.

Thus, in the embodiment of FIG. 1, the upper substrate 200 is an encapsulation substrate of the OLED display and is implemented with a transparent material. In some embodiments, the encapsulation substrate substantially seals the OLEDs from the external environment.

However, when the OLED display is a flexible display, the upper substrate 200 can be implemented as a film material (e.g., a polyimide material) having flexibility or can be implemented as having a plurality of thin film layers.

The touch screen panel includes the sensing patterns 220 formed on an upper surface of the transparent substrate serving as an encapsulation substrate and sensing lines 230 connecting the sensing patterns 220 to an external driving circuit (not shown) through a bonding pad part or bonding pad 20.

Here, the sensing patterns 220 are formed in a display region 500 in which an image is displayed and a touch position is detected. The sensing lines 230 are electrically connected to the sensing patterns 220 and the bonding pad part 20 and are formed in a non-display region 510 surrounding the display region 500.

Additionally, the upper substrate 200 is attached to a lower substrate (not shown) of the OLED display with a sealing material or sealing member 400 applied to the non-display region 510 between the upper substrate 200 and the lower substrate.

The sealing material 400 is applied to the non-display region 510 on an inner surface of the upper substrate 200 and a laser is irradiated onto the non-display region 510 at the outer edge of the upper substrate 200. Thus, the sealing material 400 is cured and the upper substrate 200 and the lower substrate are attached to each other. In some embodiments, ultraviolet (UV) light is irradiated from the laser, but the described technology is not limited thereto.

In FIG. 1, the non-display region 510 of the touch screen panel and the sealing member 400 are both illustrated as having a large width for ease of description, however, according to some embodiments, the actual widths thereof are relatively small.

In recently developed displays, the display region 500, in which an image is displayed and a touch applied thereto, occupies a larger percentage of the overall display, and thus, the non-display region 510 surrounding the display region 500 has an increasingly narrowed width.

In displays with a reduced width non-display region 510, when the sensing lines 2300 are formed in the non-display region 510 and do not overlap the sealing material, the width of the sensing lines 230 and spacing therebetween are also reduced. This results in an increase in the resistance of the sensing lines 230 and may cause short-circuiting between the sensing lines.

Thus, according to at least one embodiment, the sensing lines 230 are formed to overlap the sealing material 400 such that the width of the sensing lines 230 and the spacing therebetween are maintained, thereby maximally extending the sensing lines 230 within the display region 500.

However, when curing of the sealing member 400 is performed by a laser, the sealing material 400 may not be cured in the region at least partially overlapping the sensing lines, resulting in a reduced adhesive force between the sealing material 400 and the substrates. Thus, according to at least one embodiment, this reduced curing problem in the overlap region may be overcome by irradiation with a stronger laser than the standard laser used in curing a sealing material not overlapping sensing lines.

Accordingly, an increase in resistance of the sensing lines and short-circuiting due to the reduced size of the non-display area 510 may be prevented while minimizing a reduction in the adhesive force between the substrates due to non-cured sealing material 400, by irradiating using a stronger laser.

The structure of the touch screen panel according to an embodiment will be described in detail with reference to FIGS. 1 and 2.

As illustrated in FIG. 2, the sensing patterns 220 include a plurality of first sensing cells 220a connected in rows in a first direction (X-axis direction) and first connection lines 220a1 connecting the first sensing cells 220a in the first direction. The sensing patterns 220 also include a plurality of second sensing cells 220b connected in columns in a second direction (Y-axis direction) and second connection lines 220b1 connecting the second sensing cells in the second direction.

The first and second sensing cells 220a and 220b are alternately arranged so as not to overlap each other and the first and second connection lines 220a1 and 220b1 cross each other. In the embodiment of FIGS. 1 and 2, an insulating layer (not shown) is interposed between the first and second connection lines 220a1 and 220b, providing stability to the connection lines 220a1 and 220b1.

The first and second sensing cells 220a and 220b may be formed of a transparent conductive material such as indium-tin-oxide (ITO) and may be formed integrally with the first and second connection lines 220a1 and 220b1 or may be formed separately and electrically connected thereto.

In some embodiments, the second sensing cells 220b are integrally patterned and formed in the second direction with the second connection lines 220b1. In these embodiments, the first sensing cells 220a are patterned as separate patterns between the second sensing cells 220b and connected in the first direction by the first connection lines 220a1 formed above or below the first sensing cells 220a.

In these embodiments, the first connection lines 220a1 are directly in contact with the first sensing cells 220a at upper or lower portions of the first sensing cells 220a to be electrically connected to the first sensing cells 220a. The first connection lines 220a1 may be electrically connected to the first sensing cells 220a through a contact hole, or the like.

The first connection lines 220a1 may be formed of a transparent conductive material such as ITO, or may be formed of an opaque low-resistance metal material. When the first connection lines 220a1 are formed of an opaque material, the width, or the like, thereof can be adjusted to prevent the patterns from being visible.

The sensing lines 230 are electrically connected to the first and second sensing cells 220a and 220b by row line and by column line and connect the first and second sensing cells 220a and 220b to an external driving circuit (not shown) such as a position detection circuit through the bonding pad part 20.

The touch screen panel is a capacitive touch screen panel, and when a contact object such as a user's hand, a stylus pen, or the like, comes into contact with the touch screen panel, a change in capacitance based on the contact position is delivered from the sensing patterns 220 to the driving circuit (not shown) by way of the sensing lines 230 and the bonding pad part 20. Then, the change in the capacitance is converted into an electrical signal by X and Y input processing circuits (not shown), or the like, whereby the contact position is recognized.

The sensing lines 230 may be formed of a low resistance metal material such as molybdenum (Mo), silver (Ag), titanium (Ti), copper (Cu), aluminum (Al), molybdenum/ aluminum/molybdenum (Mo/Al/Mo), or the like. The sensing lines 230 are arranged in the non-display region 510 and a portion thereof overlaps the sealing material 400.

Namely, since the sensing lines 230 are formed of an opaque low resistance metal material, laser light is not easily transmitted through the sensing lines 230 at least partially overlapping the sealing material 400. Thus, the sealing material 400 is not sufficiently cured in the overlap region. Thus, according to at least one embodiment, as mentioned above, the problem of reduced curing of the sealing material in the overlap region is overcome by irradiating a stronger loser than the standard laser used in curing a sealing material.

However, when a higher power laser is irradiated onto the overlap region, the temperature may sharply increase in a corner region of the sealing material.

The curing of the sealing material 400 is performed by moving a laser with a substantially constant strength and speed. The movement path of the laser irradiation is changed due to the bent shape (or a substantially L or reverse L-shape) of the corner region of the sealing material, thus, these sections are irradiated by the laser repeatedly, increasing the amount of irradiation received at these sections and increasing the temperature in the corner region compared to linear regions of the sealing material 400.

Thus, when components are formed in the corner region of the non-display area and at least partially overlap the sealing material 400, they may be damaged due to the increased temperature generated in the region.

According to at least one embodiment, in order to overcome this problem, a power line formed on the lower substrate of the display device, an end portion of an electrode connected to a pixel part, and a connection part connecting the end portion of the electrode and the power line are configured to overlap the sealing material only in a region excluding the corner region of the sealing material. The components of the lower substrate are not formed in the corner region of the sealing material, and thus, may be prevented from being damaged due to the increased laser irradiation, while maximizing the area of the display region.

Figure 3:
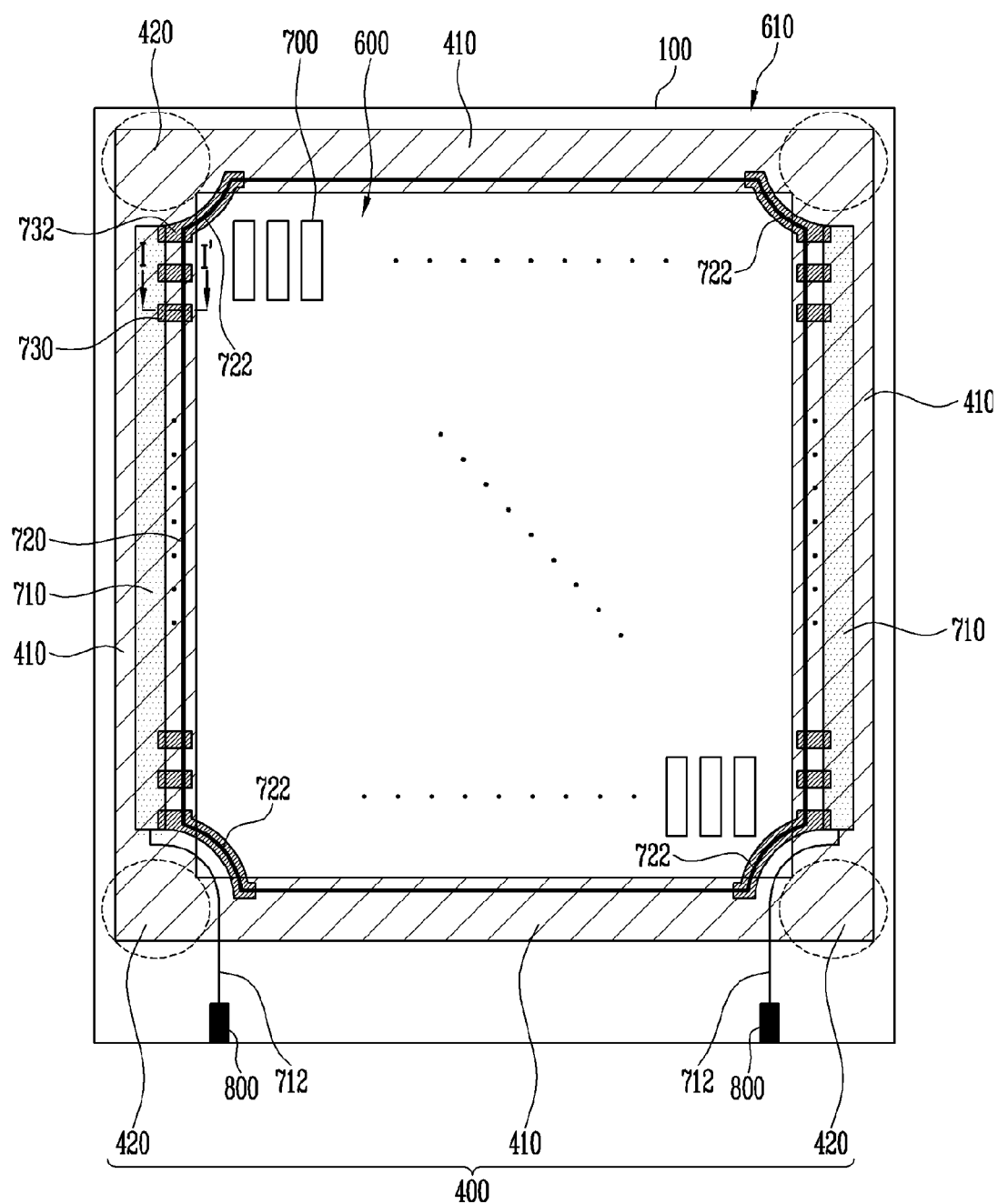
FIG. 3 is a plan view illustrating a lower substrate of the display device integrated with a touch screen panel according to an embodiment.
Figure 4:
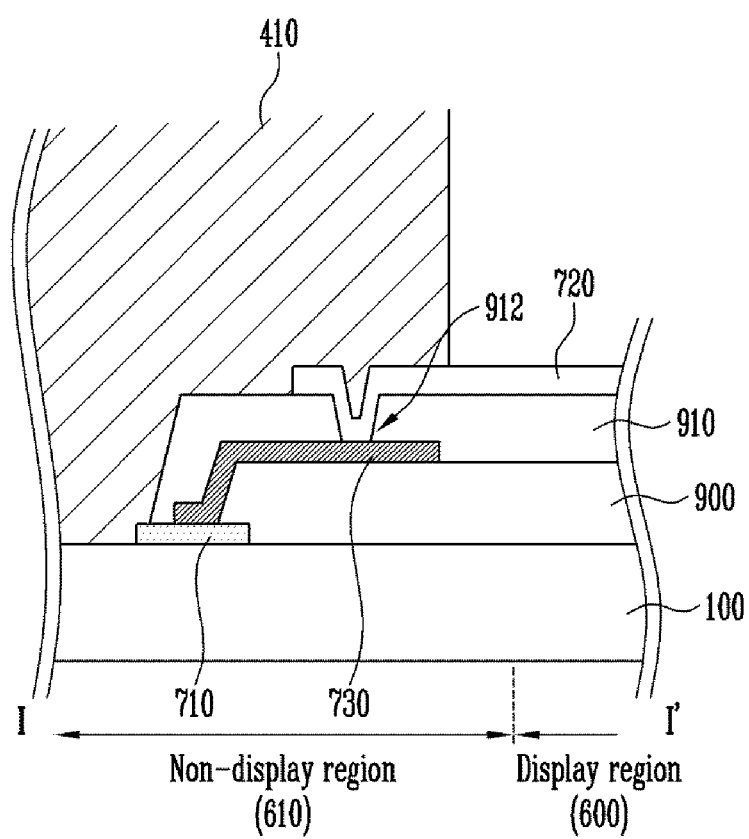
FIG. 4 is a cross-sectional view of a region of FIG. 3 taken along line I-I'.

FIG. 3 is a plan view illustrating the lower substrate of the display device integrated with the touch screen panel according to an embodiment. FIG. 4 is a cross-sectional view of a region of FIG. 3 taken along line I-I'.

Referring to FIG. 3, a display region 600 and a non-display region 610 of a lower substrate 100 correspond to the display region 500 and the non-display region 510 of the upper substrate 200 as illustrated in FIG. 1 and the sealing material 400 is applied to the non-display regions 510 and 610 between the upper substrate 200 and the lower substrate 100.

Here, the display region 600 of the lower substrate 100 includes a plurality of pixels 700. When the display device is an OLED display, each of the pixels includes an OLED, a thin film transistor (TFT) (not shown), and a capacitor (not shown).

Also, signal lines (e.g., scan lines, data lines, and the like) for driving the pixels 700 and power lines providing predetermined driving power to the OLEDs provided in the pixels 700 are formed in the non-display region 610 of the lower substrate 100. The signal lines and power lines at least partially overlap the sealing material 400.

The power lines include first power lines applying a first voltage ELVDD having a high potential to a first electrode (anode electrode) of the OLEDs and second power lines 710 applying a second voltage ELVSS having a low potential to a second electrode (cathode electrode) of the OLEDs.

Also, the second voltage ELVSS applied to the second electrode 720 provided in each pixel 700 is applied uniformly to each pixel, so the second electrode 720 may be formed on the entire surface of the lower substrate 100 region including the display region. The second electrode 720 may be electrically connected to the second power line 710 through connection parts or connection electrodes 730 and 732.

The second electrode 720 completely overlaps the display region 600 and an end portion of the second electrode 720 extends to the non-display region 610 to overlap the sealing material 400.

In the embodiment illustrated in FIGS. 3 and 4, only the second power line 710, the second electrode 720, and the connection parts 730 and 732 are illustrated as components formed in the non-display region 610 and other components are omitted for each of description. However, additional components including signal lines are formed in the non-display region 610 of the lower substrate.

Also, the second power lines 710 are illustrated in both left and right portions of the non-display region 610, but the second power lines 710 may also be formed in upper and lower portions of the non-display region 610.

Also, a scan driver (not shown) providing a scan signal to the scan lines may be formed in the non-display region 610 of the lower substrate which overlaps the sealing material 400.

As described above in the embodiment of FIG. 1, in the embodiment of FIGS. 3 and 4, the sensing lines 230 arranged in the non-display region 510 are formed in positions in which the sensing lines 230 overlap the sealing material in order to maximize the display region 500 of the touch screen panel formed on the upper substrate and minimize the non-display region 510.

The display region 600 of the lower substrate 100 has substantially the same area to correspond to the display region 500 of the upper substrate 200. Consequently, the area for the pixels 700 is maximized, and thus, at least a portion of the components (e.g., the scan driver, the signal lines, the power lines, the connection parts, and the second electrode) is formed in the non-display region 610 of the lower substrate and overlaps the sealing material 400.

In the embodiment of FIGS. 3 and 4, however, a laser having high strength is irradiated to cure the sealing material 400, and thus, the temperature at the corner region 420 of the sealing material 400 sharply increases.

Thus, when components of the lower substrate are formed on the non-display region 610 and at least partially overlap the corner region 420 of the sealing material, the components may be damaged due to the increased temperature in the region. Thus, according to at least one embodiment, the components formed in the non-display region 610 of the lower substrate are formed to at least partially overlap the sealing material only in the region 410 excluding the corner region 420 of the sealing material 400.

Referring to FIGS. 3 and 4, the second power line 710 formed on the lower substrate 100, an end portion of the second electrode 720, and the connection part 730 connecting the end portion of the second electrode 720 to the second power line 710 overlap the sealing material only in the region 410 excluding the corner region 420 of the sealing material 400. Thus, the components of the lower substrate 100 corresponding to the corner region 420 of the sealing material may be prevented from being damaged due to the increased laser irradiation, while maximizing the area of the display region 600.

According to at least one embodiment, components formed in the non-display region 610 of the lower substrate 100 overlap the linear first region 410 of the sealing material 400 and do not overlap the bent second region (corner region) 420 of the sealing material 400. In some embodiments, the bent second region has a substantially L or reverse L-shape.

FIG. 4 is a cross-sectional view of a portion I-I' of the first region 410 of the sealing material. As illustrated, the second power line 710 and the second electrode 720 formed on the lower substrate 100 and the connection part 730 connecting the second power line 710 and the second electrode 720 at least partially overlap the first region 410 of the sealing material 400.

The second power line 710 is formed in the non-display region 610 of the lower substrate 100 which overlaps the first region 410 of the sealing material 400. One side of the connection part 730 contacts the second power line 710 and the other side thereof is formed on a first insulating layer 900.

Also, a second insulating layer 910 is formed on the second power line 710 and the connection part 730 and the end portion of the second electrode 720 is electrically connected to the connection part 730 through a contact hole 912 formed in the second insulating layer 910 and overlapping the connection part 730.

The second power line 710 and the connection part 730 overlap the first region 410 of the sealing material 400 and an end portion of the second electrode 720 overlaps first region 410 of the sealing material 400.

In the embodiment illustrated in FIG. 3, the second power lines 710 formed in the left and right non-display regions 610 of the lower substrate 100 overlap the left and right first regions 410 of the sealing material 400. A connection power line 712 connects the second power line 710 to the pad part 800 and is formed bent toward the display region 600 so as not to overlap the second region 420 of the sealing material 400, i.e. the corner portion of the sealing material 400. In some embodiments, the pad part 800 is electrically connected to a power source to supply the second voltage to the second power lines 710 through the connection power line 712.

Also, the second electrode 720 is formed on the entire surface of the lower substrate 100 region including the display region 600. The second electrode 720 completely overlaps the display region 600 and an end portion of the second electrode 720 extends to the non-display region 610 to partially overlap the sealing material 400.

With reference to the embodiment illustrated in FIG. 3, the end portion of the second electrode 720 extends to overlap the first region 410 of the sealing material 400 and is bent toward the display region 600 so as not to overlap the second region 420.

Namely, the corner portion 722 of the end portion of the second electrode 720 is implemented to have a concave shape 722 to correspond to the corner region of the sealing material, so as not to overlap the corner region 420 of the sealing material.

Also, a connection part 730 connecting the second power line 710 to the second electrode 720 is formed in a position overlapping the first region 410 of the sealing material as illustrated in FIG. 3.

However, since the second electrode is implemented to have the inwardly concave shape 722 in the corner region as the second region 420 of the sealing material, the connection part 732 connected thereto is also formed to be bent toward the display region similar to the shape of the second electrode.

Thus, the second power line 710, the second electrode 720, and the connection part 730 are formed in the non-display region of the lower substrate, such that at least a portion thereof overlaps the first region 410 of the sealing material but does not overlap the second region 420 as the corner portion of the sealing material.

By way of summation and review, in general, a touch screen panel is separately manufactured and attached to an outer surface of a display panel of an image display device such as an OLED display. However, when a separately manufactured touch screen panel and an image display device are attached to be used, the overall thickness is increased and manufacturing cost is increased.

Also, display regions occupying a maximum area of the display device have become popular, and in line with this, the area of a non-display region, i.e. a dead space, surrounding the display region is minimized.

Thus, in order to form sensing lines of a touch screen panel within the narrow non-display region, the width of sensing lines and spacing therebetween are reduced, which results in an increase in resistance of the sensing lines and the generation of shot-circuits between the sensing lines.

According to at least one embodiment, in a touch screen panel directly formed on an upper substrate of a display device, sensing lines of the touch screen panel are formed to overlap a sealing material and a power line formed on the lower substrate, an end portion of an electrode connected to a pixel part, and a connection part connecting the end portion of the electrode and the power line overlap the sealing material only in a region excluding a corner region of the sealing material. Thus, components are not formed on the lower substrate in a region corresponding to the corner region of the sealing material in which high strength laser irradiation is applied, and thus, such components may be prevented from being damaged.

Exemplary embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated otherwise. Accordingly, it will be understood by those of skill in the art that various changes in form and details may be made without departing from the spirit and scope of the present invention as set forth in the following claims.

What is claimed is:

1. A touch screen display, comprising:
an upper substrate and a lower substrate each comprising a display region and a non-display region surrounding the display region, wherein each of the substrates includes a plurality of corners;
a sealing member formed between the non-display regions of the upper and lower substrates, wherein the sealing member comprises a first region and a second region and wherein the second region is located adjacent to the corners of the substrates;
a plurality of sensing patterns formed in the display region of the upper substrate;
a plurality of sensing lines formed in the non-display region of the upper substrate and respectively electrically connected to the sensing patterns, wherein the sensing lines at least partially overlap the sealing member adjacent to a plurality of sides of the substrates;

a plurality of pixels formed in the display region of the lower substrate;

an electrode formed over substantially the entire display region of the lower substrate and electrically connected to each of the pixels;

at least one power line formed in the non-display region of the lower substrate; and a first connection electrode electrically connecting the power line to an end portion of the electrode, wherein each of i) the power line, ii) the end portion of the electrode, and iii) the first connection electrode at least partially overlaps the first region and does not overlap the second region, wherein the end portion of the electrode extends to the non-display regions of the upper and lower substrates, and wherein a corner portion of the end portion of the electrode has a concave shape formed towards the display region so as to not overlap the second region of the sealing member.

2. The touch screen display as claimed in claim 1, wherein the first region has a substantially linear shape and wherein the second region has a substantially L or reverse L-shape.

3. The touch screen display as claimed in claim 1, further comprising a second connection electrode electrically connecting the power line to the end portion of the electrode, wherein the second connection electrode has a concave shape formed towards the display region so as to not overlap the second region of the sealing member.

4. The touch screen display as claimed in claim 1, wherein each pixel comprises an organic light-emitting diode (OLED) and wherein the electrode is a cathode electrode of each OLED.

5. The touch screen display as claimed in claim 4, wherein the power line is configured to apply a low potential voltage to each of the OLEDs.

6. The touch screen display as claimed in claim 1, wherein the sensing patterns comprise:

a plurality of first sensing cells electrically connected to each other to form a plurality of rows in a first direction;

a plurality of first connection lines electrically connecting the first sensing cells in the first direction;

a plurality of second sensing cells electrically connected to each other to form a plurality of columns in a second direction crossing the first direction; and a plurality of second connection lines electrically connecting the second sensing cells in the second direction.

7. The touch screen display as claimed in claim 6, wherein the first and second sensing patterns are formed on the same layer.

8. The touch screen display as claimed in claim 7, wherein the second sensing cells are integrally formed with the second connection lines.

9. The touch screen display as claimed in claim 8, further comprising an insulating layer interposed between the first and second connection lines.

10. The touch screen display as claimed in claim 6, wherein the sensing patterns are formed on an outer surface of the upper substrate.

11. The touch screen display as claimed in claim 4, wherein the upper substrate comprises an encapsulation substrate substantially sealing the OLEDs.

12. A display device, comprising:

a substrate comprising a display region and a non-display region surrounding the display region, wherein the substrate has a plurality of corners;

a sealing member formed in the non-display region, wherein the sealing member comprises a first region and a second region and wherein the second region is located adjacent to the corners;

a plurality of pixels formed in the display region;

a plurality of sensing patterns formed over the pixels in the display region;

a plurality of sensing lines formed in the non-display region and respectively electrically connected to the sensing patterns, wherein the sensing lines at least partially overlap the sealing member adjacent to a plurality of sides of the substrate;

an electrode interposed between the pixels and the sensing patterns, wherein the electrode has a plurality of corners respectively corresponding to the corners of the substrate, and wherein each of the corners of the electrode has a concave shape formed towards the display region so as to not overlap the second region of the sealing member;

a power line formed in the non-display area and electrically connected to the electrode, wherein the electrode and the power line each at least partially overlap the first region and do not overlap the second region;

a power source; and a connection power line formed in the non-display region and electrically connected to the power source and the power line, wherein the connection power line as a concave shape formed towards the display region so as to not overlap the second region of the sealing member.

13. The display device of claim 12, further comprising a first connection electrode formed in the non-display area and electrically connected to the power line and the electrode, wherein the first connection electrode at least partially overlaps the first region and does not overlap the second region.

14. The display device of claim 13, further comprising a second connection electrode electrically connecting the power line to the electrode, wherein the second connection electrode has a concave shape formed towards the display region so as to not overlap the second region of the sealing member.

* * * * *